(12) United States Patent
Agerer et al.

(10) Patent No.: US 8,673,191 B2
(45) Date of Patent: Mar. 18, 2014

(54) APPARATUS FOR PRODUCING PLASTIC PARTS INTERSPERSED WITH REINFORCING FIBRES

(75) Inventors: Markus Agerer, Gröbenzell (DE); Josef Renkl, Markt Indersdorf (DE)

(73) Assignee: KrauseMaffei Technologies GmbH, München (DE)

( * ) Notice: Subject to any disclaimer, the term of this patent is extended or adjusted under 35 U.S.C. 154(b) by 159 days.

(21) Appl. No.: 13/203,549

(22) PCT Filed: Feb. 22, 2010

(86) PCT No.: PCT/EP2010/052180
§ 371 (c)(1),
(2), (4) Date: Aug. 26, 2011

(87) PCT Pub. No.: WO2010/100045
PCT Pub. Date: Sep. 10, 2010

(65) Prior Publication Data
US 2011/0305788 A1    Dec. 15, 2011

(30) Foreign Application Priority Data
Mar. 5, 2009    (DE) .......................... 10 2009 011 900

(51) Int. Cl.
*B29B 7/76*    (2006.01)
*B29B 7/90*    (2006.01)

(52) U.S. Cl.
USPC .......................................... 264/130; 264/462

(58) Field of Classification Search
USPC .................................................. 425/130, 462
See application file for complete search history.

(56) References Cited

U.S. PATENT DOCUMENTS

| | | | |
|---|---|---|---|
| 4,050,677 A | 9/1977 | Benthin | |
| 5,858,416 A | 1/1999 | Söchtig et al. | |
| 6,276,915 B1* | 8/2001 | Merziger et al. | ........... 425/133.1 |
| 6,453,926 B1 | 9/2002 | Baker | |
| 2005/0255187 A1* | 11/2005 | Kazmer | ........................ 425/563 |

FOREIGN PATENT DOCUMENTS

| | | |
|---|---|---|
| DE | 20 17 548 | 10/1971 |
| DE | 26 01 368 A1 | 7/1976 |
| DE | 26 28 854 A1 | 1/1978 |
| DE | 28 23 189 A1 | 11/1979 |

(Continued)

*Primary Examiner* — Ryan Ochylski
(74) *Attorney, Agent, or Firm* — Henry M. Feiereisen LLC

(57) ABSTRACT

The present invention relates to an apparatus for producing plastic parts interspersed with reinforcing fibers, with a mixing chamber (20) for producing a mixture of chemically reactive polymer components, with an outlet chamber (38), which is arranged downstream of the mixing chamber and in which a cleaning ram (28) in which a fiber conveying channel (32) is formed is guided in a reciprocatingly movable manner. The invention is characterized in that the end face of the cleaning ram is provided with a die (34), through which the fiber conveying channel (32) extends and arranged on the outer circumference of which there is an annular groove (40), which is at a distance from the end of the die (34) and can be positioned in such a way that, in a first working position, a flow connection between the mixing chamber (20) and the annular groove (40) is formed and, in another working position of the cleaning ram (28), the flow connection between the mixing chamber (20) and the annular groove (40) is interrupted and in that at least one die channel (42), preferably a plurality of die channels (42), is/are formed between the annular groove (40) and the outlet-side end of the die (34), said channel(s) opening at the end face into the outlet chamber (38).

15 Claims, 2 Drawing Sheets

(56) References Cited

FOREIGN PATENT DOCUMENTS

| DE | 30 13 237 A1 | 10/1981 |
| DE | 295 05 082 U1 | 5/1995 |
| EP | 0 771 259 | 8/1995 |
| EP | 0 895 815 A1 | 2/1999 |
| WO | WO 2005/113215 A1 | 12/2005 |

* cited by examiner

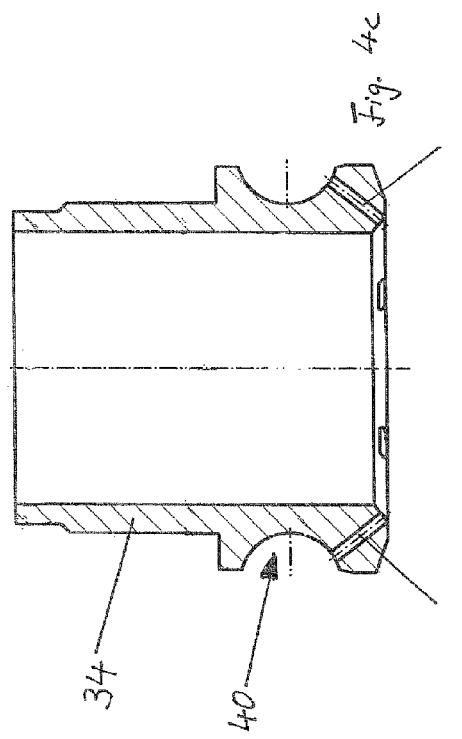
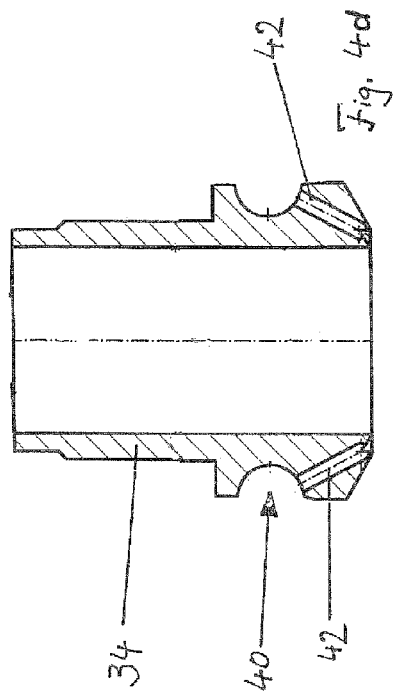
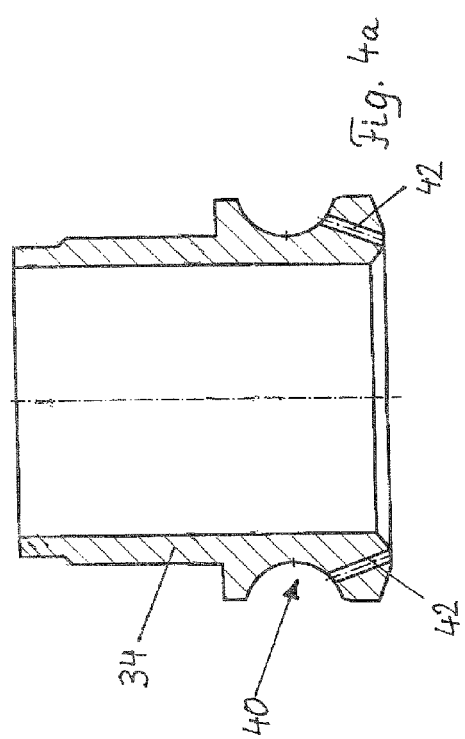
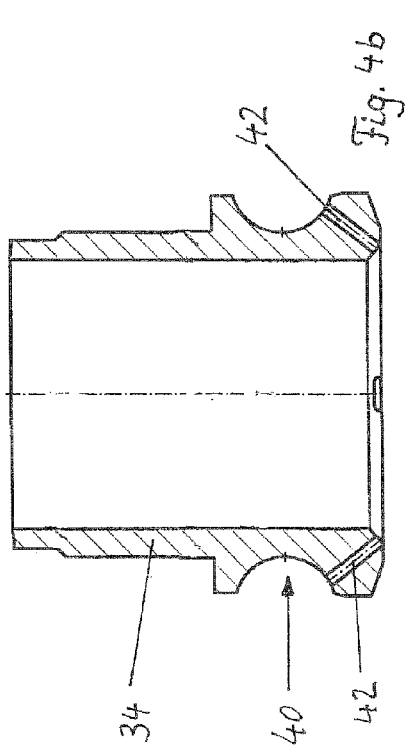

APPARATUS FOR PRODUCING PLASTIC PARTS INTERSPERSED WITH REINFORCING FIBRES

CROSS-REFERENCES TO RELATED APPLICATIONS

This application is the U.S. National Stage of International Application No. PCT/EP2010/052180, filed Feb. 22, 2010, which designated the United States and has been published as International Publication No. WO 2010/100045A1 and which claims the priority of German Patent Application, Serial No. 10 2009 011 900.0, filed Mar. 5, 2009, pursuant to 35 U.S.C. 119(a)-(d).

BACKGROUND OF THE INVENTION

The present invention relates to an apparatus for producing plastic parts interspersed with reinforcing fibres.

Such apparatus are known from the prior art. Thus, in EP 771 259 B1 a generic apparatus is indicated for producing plastic parts interspersed with reinforcing fibres, in which a cleaning ram is guided in a reciprocatingly movable manner in an outlet chamber. The cleaning ram has an internally constructed fibre conveying channel. Between the cleaning channel and the cylindrical outlet chamber an annular space is provided, through which the reactive system, produced in a mixing chamber, is transported parallel to the fibre conveying channel in the direction of the outlet. At the end of the cleaning ram, the flow of reactive starting material unites with the fibres which are supplied in the fibre conveying channel.

From DE 26 28 854 A1 a method is known for producing shaped parts reinforced with glass fibres, in which a reactive material is formed in a mixing chamber, which is discharged via a die. One or more fibre streams are fed into the stream of the reactive material mixture outside the apparatus.

From DE-OS 20 17 548 a method and an apparatus are known for the continuous, dosed introduction of filler material with foam compositions, in which a fibre material is guided inside a dosing nozzle, which emerges at the end of the dosing nozzle into an outlet chamber. Between the dosing nozzle and the casing housing an annular channel is formed, at the lower end of which annular dies are formed between the casing housing and the dosing nozzle, so that the reactive material mixture can be introduced via these annular dies into this fibre stream. However, this apparatus is not able to be used for a cleaning ram which is movable reciprocatingly.

DE 28 23 189 A1 describes a mixing head in which a fibre material is fed to a mixing head via a channel. Two injection ducts, which introduce the individual reactive components or the reactive mixture, are directed into a mixing chamber in which the fibre material is supplied. The fibre material, which is impregnated with the reactive material, is then brought out via a discharge.

In DE 26 01 368 A1 an apparatus is described for producing construction parts reinforced with fibres, in which an inner tube is arranged in a mixing head, to which a fibre stream, with air-guided fibres, can be fed. At the same time, compressed air is introduced via the tube, which emerges at the front end via bores which are inclined to the tube axis. At the same time, between an annular space between the casing and the housing, a reactive material mixture can be introduced, which unites with the fibre material at the end on the discharge side. The air bores are arranged here between the fibre channel and the annular channel for the reactive material.

In DE 30 13 237 A1 a method and an apparatus are described for producing a mixture consisting of at least two flowable reaction components and fillers, forming solid or foam material. Here, reaction components are fed via injection openings in a mixing head of a mixing chamber and introduced into an outlet bore. A feed of filler material likewise opens into this outlet bore.

SUMMARY OF THE INVENTION

It is an object of the present invention to indicate a further mixing head which, with a movable cleaning ram, guarantees as optimum a mixing as possible between a reactive material mixture and fed materials, in particular fibre materials.

This problem is solved by an apparatus for producing plastic parts interspersed with reinforcing fibres, with a mixing chamber for producing a mixture of chemically reactive plastic components, with an outlet chamber which is arranged downstream of the mixing chamber and in which a cleaning ram is guided in a reciprocatingly movable manner, in which a fibre conveying channel is formed, wherein the end face of the cleaning ram is provided with a die, through which the fibre conveying channel extends and arranged on the outer circumference of which there is an at least partially circumferential annular groove, which is at a distance from the end of the die and can be positioned in such a way that, in a first working position, a flow connection between the mixing chamber and the annular groove is formed and, in another working position of the cleaning ram, the flow connection between the mixing chamber and the annular groove is interrupted and in that at least one die channel, preferably a plurality of die channels, is/are formed between the annular groove and the outlet-side end of the die, said channel(s) opening substantially at the end face into the outlet chamber.

According to the present invention, on the end face of the cleaning ram a die is provided, through which on the one hand the fibre conveying channel extends and in which, on the other hand, an annular groove is arranged on the outer circumference, which in one position is able to be brought in connection with the mixing chamber with regard to flow, and in another position has no flow connection to the mixing chamber. As from the annular groove to the outlet-side end of the die at least one, preferably however several die channels are formed, the reactive material mixture which is made available to the die channels from the mixing chamber via the annular groove is, as it were, atomised into the fed matter, in particular the fibres, so that the materials which are brought together mix with each other in a particularly optimum manner.

According to a preferred embodiment, the die bores terminate radially outside the fibre conveying channel, so that the reactive material mixture is sprayed in radially into the fibre stream from the outside.

Through particular embodiments at the end of the die channels, for example by widenings (lentiform widenings) or wedge-shaped grooves, particular measures can be achieved for the effective atomizing of the material mixture. A particularly good introduction of the reactive material is also provided if the die bores are distributed circumferentially uniformly around the fibre conveying channel.

Preferably, the axes of the die bores should form in their extension an acute angle with the axis of the fibre conveying channel. The angle should lie at least in the range of 5° to 85°; angles of between 10° and 50° can also be selected as preferred angle ranges.

According to a further preferable embodiment of the present invention, all die bores are aligned such that their imaginary extensions intersect each other in a single intersection point. This intersection point can, moreover, lie on the central axis of the fibre conveying channel. With regard to its axial length, the point of intersection of the imaginary extensions can come to lie inside or outside the outlet chamber. This depends substantially on the angle with which the outlet dies are formed with respect to the longitudinal axis.

According to a particularly preferred embodiment of the invention, air-conducting bores (at least one) are also provided, which are arranged with respect to the direction of movement of the cleaning ram such that on the one hand they are selected to be offset with respect to the flow connection with the mixing chamber, and on the other hand are able to be brought in connection with the annular groove in at least one position of the cleaning ram.

According to a further embodiment of the invention, the air conducting bores open directly into the outlet channel, for the case where the annular groove is connected with the mixing chamber.

In a first position, the air conducting bores can blow out the die bores and thereby prevent an accumulation of reactive material components in the die bores. In a second position and for the case where the mixing head is in the operative conveying operation, in which the reactive material is sprayed in via the mixing chamber and the annular channel and the die bores into the fibre conveying stream, the air can assist or respectively ensure, via the air supply bores, the transportation of the entire stream and the spacing of the stream from the wall of the mixing head.

BRIEF DESCRIPTION OF THE DRAWING

A practical embodiment of the present invention is described in further detail below and with reference to the enclosed drawings, in which are shown in FIG. 1 a diagrammatic front view of a mixing head according to the invention, FIG. 2 a diagrammatic partial section representation along the line A-A of FIG. 1, FIG. 3 an enlarged partial section representation of the region B of FIG. 2 and FIG. 4a-4d four different embodiments of a die respectively in a sectional representation.

DETAILED DESCRIPTION OF PREFERRED EMBODIMENTS

Figure 1:
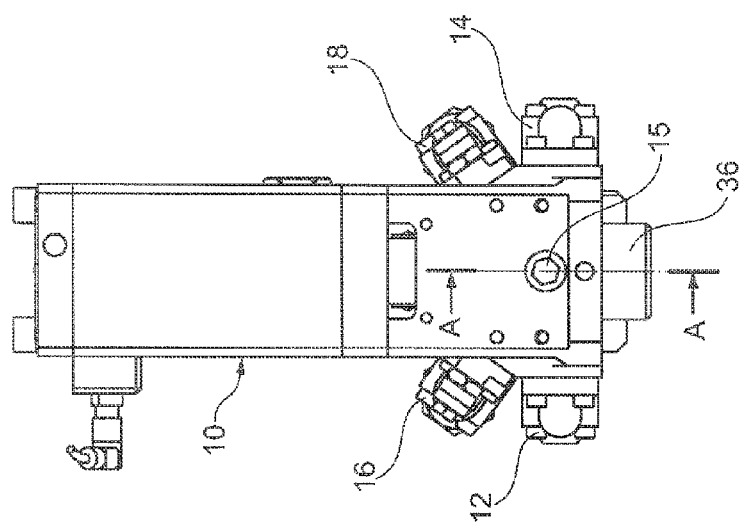

In FIG. 1 in diagrammatic front view, a mixing head 10 with corresponding housing and two material feed lines 12 and 14 and two material return lines 16 and 18 are illustrated. At the lower end of the mixing head 10, an outlet tube 36 can be seen, from which—as will be further explained below—the mixture of fibres and reactive components is discharged.

Figure 2:
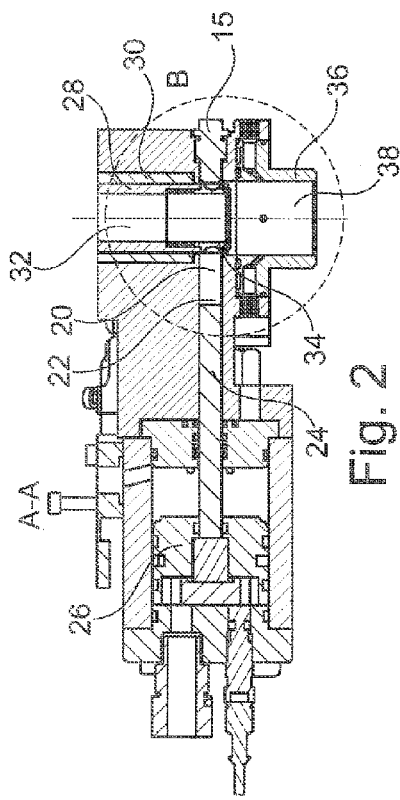

In FIG. 2 the lower part of the mixing head illustrated in FIG. 1 is shown along the line A-A in a sectional representation. Here, the mixing head 10 has in a bore of its housing a bush 30, in which a cleaning ram 28 is guided in a reciprocatingly movable manner. Both the bush 30 and also the cleaning ram are only partially illustrated here (lower region respectively). Inside the cleaning ram 28, a fibre conveying channel 32, having a circular cross-section, is formed, which runs coaxially to the housing bore.

The fibre conveying channel 32 of the cleaning ram 28 opens into a coaxial cylindrical outlet channel 38 in the outlet tube 36.

Figure 3:
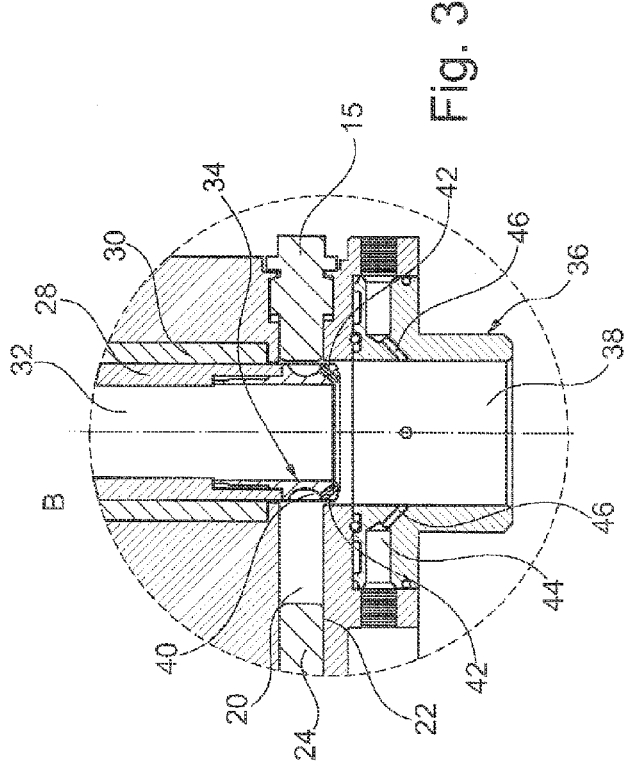

At its front end, the cleaning ram 28 has a die insert 34, which can be seen on an enlarged scale in FIG. 3. Various embodiments of such dies, which are explained in further detail below, are illustrated in FIGS. 4a-4d.

In FIG. 2 it is shown that a mixing chamber 20 opens into outlet chamber 38, which mixing chamber in this example embodiment runs at right-angles and in which the reactive components (e.g. polyol and isocyanate) are injected and mixed with each other. In this mixing chamber 20 a control ram 26 is likewise guided in a reciprocatingly movable manner, wherein the drive of the control ram is realized by a ram 26 in a hydraulic cylinder with corresponding hydraulic lines.

A bore is closed by the plug 15, said bore serving for the manufacturing construction of the mixing chamber 20.

The mode of operation of the mixing head described above will now be explained with the aid of FIG. 3.

Via die openings 22, only one of which is illustrated in FIG. 3, the individual reactive starting components polyol and isocyanate are injected into the mixing chamber with the control ram 24 drawn back, and are mixed with each other in the high pressure injection method. The cleaning ram 28 is in a position here such that an annular groove 40, extending over the entire circumference of the die insert 34, is situated at the level of the mixing chamber and receives material from there. The material originating from the mixing chamber 20 is distributed via the annular groove circumferentially around the cleaning ram 28. A plurality of die channels 42 lead from the annular groove—arranged circumferentially with equidistant spacing—to the front end of the die insert 28 at the end face. Here, these die channels 42 terminate radially slightly outside the radially outer boundary of the fibre conveying channel. The reaction mixture produced in the mixing chamber 20 is therefore injected via the annular channel 40 and the plurality of die channels 42 in a V-shaped manner into the fibre stream, which is conveyed through the fibre conveying channel 32, and emerges therefrom, and mixes intimately with it. In this, the die channels 42 are arranged here with an angle of 10°-50° to the longitudinal axis of the fibre conveying channel 32 and meet all together in a single intersection point on this axis. This intersection point still lies inside the outlet chamber 38.

Through this "beaming in", an optimum wetting and turbulence of the fibres takes place with a correspondingly drawn back cleaning ram, as illustrated in FIG. 3. At the same time, air is blown in via four air conveying channels 46, arranged uniformly distributed circumferentially, which are arranged in the outlet tube 36, likewise at an acute angle. This air helps to guide and convey the wetted fibre stream.

If no more fibre material mixture is now to be discharged, then on the one hand the fibre stream through the fibre conveying channel 32 is prevented. On the other hand, the cleaning ram 38 is displaced forward and namely such that now the annular groove 40 comes to lie over the air channels 46. Thereby, on the one hand the inflow of reactive material to the annular groove 40 is prevented and on the other hand the annular groove is supplied via the air channels 46 with air which is blown out via the die channels 42. Thereby, the die channels 42 can be flushed and cleaned accordingly, in order to thus prevent an accumulation of reactive material in the die channels 42 resulting in a blockage.

At the same time as the pushing forward of the cleaning ram 28, the control ram 24 is also pushed forward with the effect that the individual reactive starting materials are guided back in recirculation grooves (not illustrated) into the returns 16 and 18 of the individual components.

In FIGS. 4a-4d various embodiments are illustrated for die inserts 34, wherein each die insert has a responding annular groove 40 and corresponding die channels 42. In the embodiment in FIG. 4a, a total of four die channels 42 are provided, which terminate in an acute angle at a substantially flat end face and are arranged equidistantly from each other.

The embodiment of the die insert 34 in FIG. 4b differs from that of FIG. 4a merely in that the die channels 42 now terminate at an oblique inner side and therefore the reactive starting mixture can be injected somewhat more directly into the fibre stream.

Six die channels 42 are arranged in FIG. 4c, which in an analogous manner to the embodiment of FIG. 4b open into the region of the die insert 34 at the end face.

A die insert can be seen from FIG. 4d, in which the two die bores 42 which can be seen (several may be provided, however) terminate in a circumferential wedge-shaped groove, which is intended to bring about an atomization of the outflowing polyurethane.

A mixing head is provided by the present invention, in which a good wetting with reactive starting material can be achieved with a reciprocatingly movable cleaning ram.

What is claimed is:

1. Apparatus for producing plastic parts interspersed with reinforcing fibres, comprising:
    a mixing chamber for producing a mixture of chemically reactive plastic components;
    an outlet chamber which is arranged downstream of the mixing chamber and in which a cleaning ram is guided for reciprocating movement, said cleaning ram including a fibre conveying channel; and
    a die insert provided on an end face of the cleaning ram, said fibre conveying channel sized to be contained within the die insert, said die insert having an outer circumference formed with an at least partially circumferential annular groove arranged at a distance from an end face of the die insert in such a way that in a first working position of the cleaning ram a flow connection between the mixing chamber and the annular groove is formed and in a second working position of the cleaning ram the flow connection between the mixing chamber and the annular groove is interrupted, wherein the die insert includes at least one die channel between the annular groove and an outlet-side end of the die insert, said die channel opening substantially at the end face of the die insert into the outlet chamber.

2. The apparatus of claim 1, wherein the die has a plurality of die channels.

3. The apparatus of claim 2, wherein the die channels are arranged circumferentially, distributed uniformly around the fibre conveying channel.

4. The apparatus of claim 2, wherein the die channels are aligned such that their imaginary extensions intersect in an intersection point.

5. The apparatus of claim 1, wherein the at least one die channel is configured to open radially outside the fibre conveying channel into the outlet chamber.

6. The apparatus of claim 1, wherein the at least one die channel terminates in a widening in the outlet chamber.

7. The apparatus of claim 6, wherein the widening has a lentiform or circular configuration.

8. The apparatus of claim 1, wherein the at least one die channel terminates in a wedge-shaped groove.

9. The apparatus of claim 1, wherein the at least one die channel defines an axis which forms at least in an outlet region thereof an angle in the range of 5 to 85° with an axis of the fibre conveying channel.

10. The apparatus of claim 1, wherein the at least one die channel defines an axis which forms at least in an outlet region thereof an angle in the range of 10 to 50° with an axis of the fibre conveying channel.

11. The apparatus of claim 1, wherein the fibre conveying channel is constructed with a circular cross-section.

12. The apparatus of claim 1, further comprising at least one air channel provided offset with respect to a direction of movement of the cleaning ram for the flow connection with the mixing chamber.

13. The apparatus of claim 12, wherein the at least one air channel is connectable with the annular groove at least in one position of the die.

14. The apparatus of claim 12, wherein the at least one air channel is configured to open directly into the outlet chamber in the first working position of the cleaning ram.

15. The apparatus of claim 12, wherein the at least one air channel defines an axis which forms at least in an outlet region thereof an angle in the range of 5 to 85° with an axis of the outlet chamber.

* * * * *